United States Patent

[11] 3,603,423

[72] Inventor Richard H. A. Schoonover
  West Linn, Oreg.
[21] Appl. No. 811,512
[22] Filed Mar. 28, 1969
[45] Patented Sept. 7, 1971
[73] Assignee Katrak Vehicle Co.
  Canby, Oreg.

[54] TRACTION CONTROL SYSTEM FOR TANDEM TYPE VEHICLE WHEELS
 4 Claims, 9 Drawing Figs.
[52] U.S. Cl. ................................................ 180/74,
  180/22, 280/80 R, 280/104.5 A
[51] Int. Cl. .............................................. B60k 17/36
[50] Field of Search ...................................... 180/22, 22
  A, 22 B, 22 C, 22 H, 74

[56] References Cited
UNITED STATES PATENTS

| | | | |
|---|---|---|---|
| 1,198,098 | 9/1916 | Bergh | 180/74 UX |
| 1,933,675 | 11/1933 | Marcum | 180/22 |
| 2,124,708 | 7/1938 | Peter | 180/74 UX |
| 2,225,016 | 12/1940 | Mallet et al. | 180/22 |
| 2,380,181 | 7/1945 | Krenzien | 180/74 |
| 2,757,373 | 7/1956 | Marrie | 180/22 X |
| 3,343,621 | 9/1967 | VanDoorne | 180/74 |
| 3,446,302 | 5/1969 | Schoonover | 180/22 (H) UX |

*Primary Examiner*—A. Harry Levy
*Attorney*—Oliver D. Olson

ABSTRACT: The tandem wheels of a vehicle are interconnected through their axles or drive differential mechanism in such manner that the driving or braking force tending to elevate one of the wheels off the road is opposed by a force derived from the resultant driving or braking torque of the axles or differential mechanism.

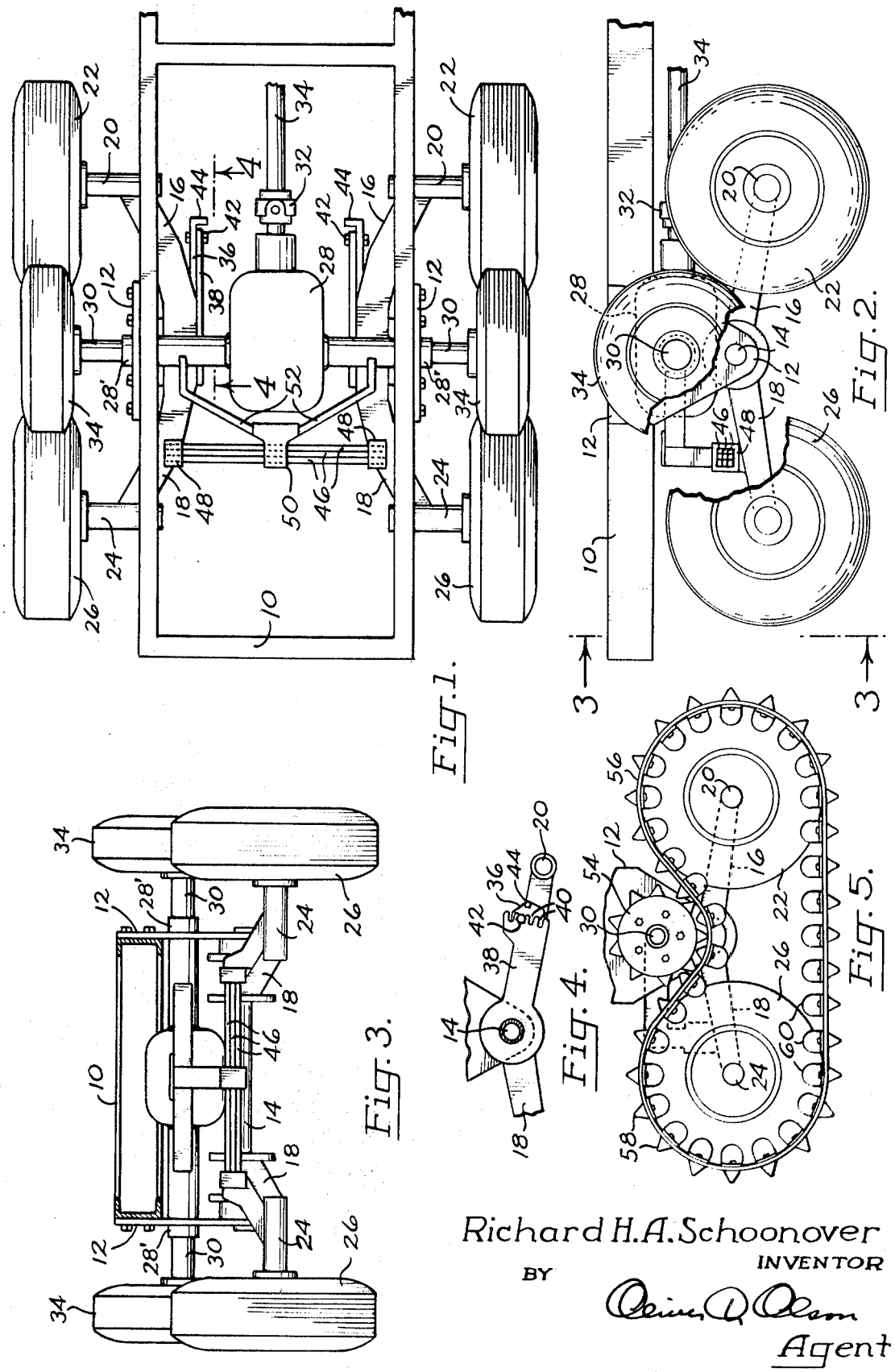

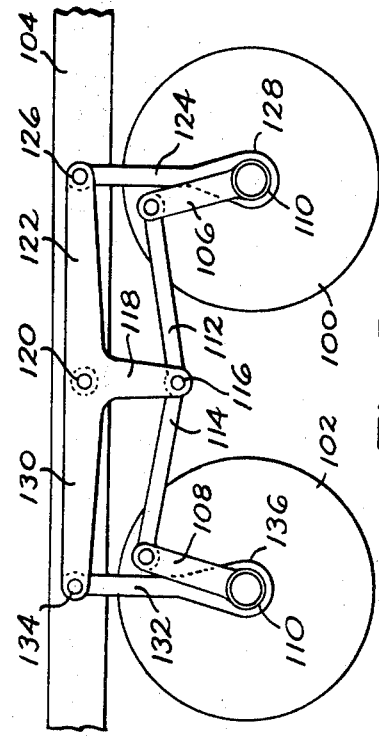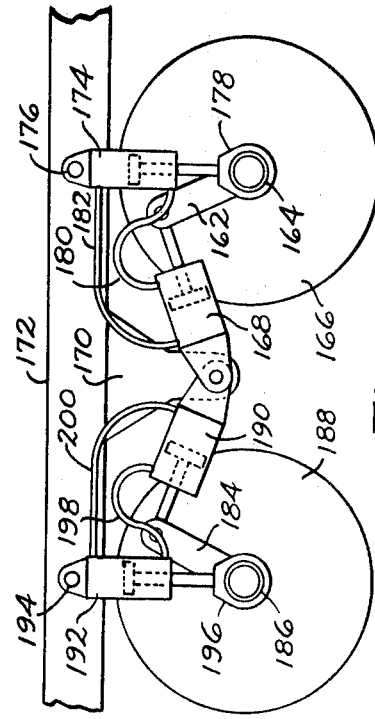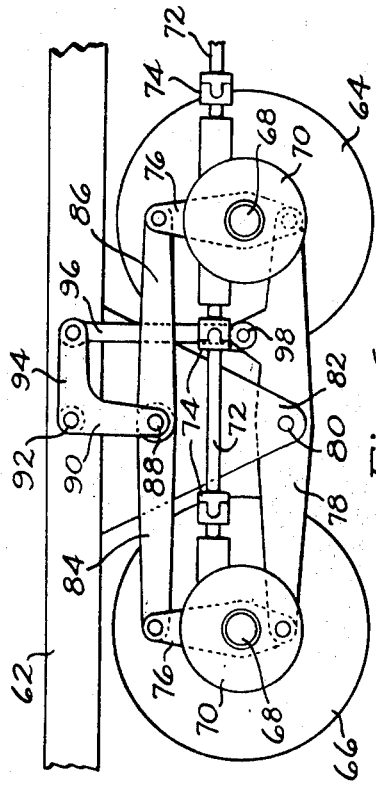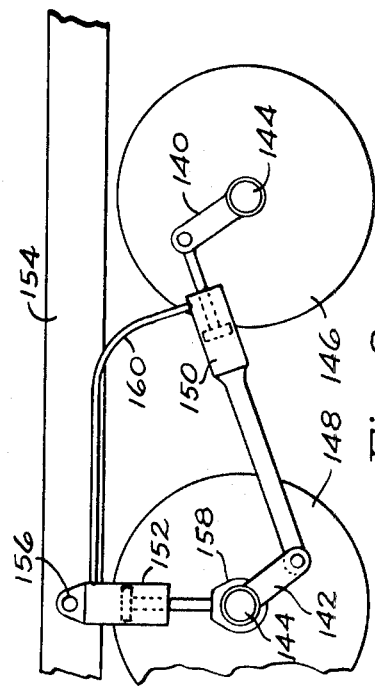

3,603,423

1

TRACTION CONTROL SYSTEM FOR TANDEM TYPE VEHICLE WHEELS

BACKGROUND OF THE INVENTION

This invention relates to vehicle suspension systems, and more particularly to a traction control system which functions automatically to maintain substantially equal weight or road pressure on the front and rear wheels of a tandem wheel assembly by minimizing the tendency of the front wheels to raise off the road during heavy pulling and the rear wheels to raise off the road during heavy braking.

Prior attempts to prevent raising of one wheel of a tandem wheel assembly during heavy pulling or braking are characterized by structures in which means is provided for neutralizing the driving or braking torque of the axles or differential mechanism. Such structures do not effectively solve the problem, and yet are generally complex and costly and are not adaptable to incorporation in conventional suspension systems.

SUMMARY OF THE INVENTION

In its basic concept the traction control system of the present invention utilizes the driving or braking torque of the axles or differential mechanism of a tandem-type wheel assembly to derive a force which is applied in opposition to the force tending to elevate one of the wheels off the road during heavy pulling or braking.

It is by virtue of the foregoing basic concept that the principal objective of the present invention is achieved, namely to overcome the disadvantages of prior systems, as enumerated hereinbefore.

Another important object of this invention is the provision of a traction control system of the class described which is adaptable for use with tandem wheels having pneumatic tires or with tandem wheels of the track-laying type.

Still another important object of the present invention is the provision of a traction control system of the class described which is adaptable for use with trailers or other types of unpowered vehicles in which the tandem wheels are provided with brake mechanism, and with other types of vehicles in which one or both of the tandem wheels are powered.

A further important object of this invention is the provision of a traction control system of the class described which is adaptable for use with tandem type vehicle wheels which are supported independently for vertical movement or which are supported on a common walking beam.

The foregoing and other objects and advantages of the present invention will appear from the following detailed description taken in connection with the accompanying drawings of the preferred embodiments. BRIEF DESCRIPTION OF THE DRAWINGS FIG. 1 is a fragmentary plan view of a tandem-type vehicle incorporating a traction control system embodying the features of the present invention.

FIG. 2 is a fragmentary view in side elevation, partly broken away, as viewed from the bottom in FIG. 1.

FIG. 3 is a rear end elevation as viewed from the left in FIG. 1.

FIG. 4 is a fragmentary sectional view taken from the line 4—4 in FIG. 1.

FIG. 5 is a fragmentary view in side elevation, similar to FIG. 2, showing the traction control system applied to the tandem wheels of a vehicle of the track-laying type.

FIGS. 6, 7, 8 and 9 are fragmentary side elevations showing somewhat diagrammatically various modified forms of traction control systems embodying the features of the present invention. DESCRIPTION OF THE PREFERRED EMBODIMENTS Referring first to the embodiment illustrated in FIGS. 1–4, the laterally spaced longitudinal side members of the vehicle frame 10 each supports intermediate its ends a downwardly projecting bracket 12. Aligned openings in these brackets receive the transverse shaft 14 which is journaled in suitable bearings (not shown). The shaft pivotally supports a pair of laterally spaced wheel mounting members. In the embodiment illustrated each member comprises a pair of arms 16 and 18 mounted pivotally at their inner ends on the shaft. One of the arms 16 extends in the forward direction of the vehicle frame, and a transverse stub shaft 20 on the forward end of the arm rotatably mounts the front wheel and pneumatic tire assembly 22. The other arm 18 extends in the rearward direction of the vehicle frame and the transverse stub shaft 24 at the rearward end of the arm rotatably mounts the rear wheel and tire assembly 26.

Aligned openings in the brackets 12 above the shaft 14 receive therethrough the opposite end portions 28' of a differential housing 28, for support in suitable bearings (not shown). Driven shafts 30 extend laterally outward from the housing. The inner ends of these shafts are coupled to the differential gear mechanism in the central main portion of the housing, which gear mechanism in the central main portion of the housing, which gear mechanism is connected through the universal joint 32 to the main drive shaft 34 extending from a transmission associated with a vehicle engine, in conventional manner.

The outer end of each driven shaft 30 supports a driven wheel 34. In the embodiment illustrated the wheel includes a pneumatic tire positioned between and in frictional driving contact with the associated pair of front and rear wheels 22 and 26.

Means is provided for adjusting the angular relationship between the pair of arms 16 and 18 to insure proper driving contact between the front and rear wheels and selected sizes of driven wheels. To this end there is secured to each of the front arms 16 a forwardly extending plate 36 and to each of the rear arms 18 a forwardly extending plate 38. The forward end of the plate 38 is provided with a plurality of notches 40 (FIG. 4) arranged in an arcuate path with reference to the axis of the shaft 14. An opening in the other plate 36 registers with these notches and receives a locking bolt 42 by which the plates may be secured together in various positions of angular adjustment. A lug 44 projecting inward from the front end of the plate 36 provides a fulcrum for a tool, such as a pry bar, adapted to engage one of the notches to facilitate the adjustment.

It will be apparent that when the arms 16 and 18 are secured together in a desired position of angular adjustment, they form a rigid walking beam.

The pivotal mounting of the differential housing 28 and the provision of the universal connector 32 between the main drive shaft and the differential mechanism allows a degree of torsional rotation of the differential housing about the axis of the driven shafts 30. Such pivotal movement occurs, in one direction or the other, upon the application of a heavy driving force or braking force to the vehicle. In the embodiment illustrated (FIG. 2), the torque of the differential housing is in the clockwise direction about the shaft when a heavy driving force is applied to move the vehicle in the forward direction toward the right. The torque of the differential housing is in the counterclockwise direction about the shaft when a heavy braking force is applied.

In accordance with the present invention means is provided for utilizing the torque of the differential housing to prevent the front wheel 22 from raising off the road upon the application of a heavy forward driving force to the vehicle and for preventing raising the rear wheel 26 off the road upon application of a heavy braking force to the vehicle. In its basic concept this means comprises a coupling between the differential housing and the wheel mounting members. In the embodiment illustrated in FIGS. 1–4, this coupling comprises a transverse connector member composed of a plurality of resilient bars 46. The opposite lateral ends of the bars are received freely in socket members 48, one secured to each of the rear arms 18. Intermediate their ends the bars are confined freely in a sleeve 50 supported by the angular bracket 52. The terminal ends of the bracket are welded or otherwise secured to the differential housing.

Accordingly, the application of a heavy driving force to the vehicle tends to cause the front wheels 22 to raise off the ground. However, the application of such a driving force simultaneously applies to the differential housing 28 a clockwise torque which, through the coupling provided by the bracket 52 and connector bars 46, applies a clockwise rotational force to the walking beams, about their pivot shaft 14. The front wheels thus are moved downward away from the vehicle frame into firm pressure contact with the road, substantially equal to the pressure contact of the rear wheels 26.

Similarly, when a heavy braking force is applied, the tendency of the rear wheel 26 to raise off the road is opposed by a downward force applied to the connector bars 46 through the bracket as a result of the counterclockwise torque of the differential housing 28. Thus, the usual bouncing of the rear wheels, and the hazard resulting therefrom, are eliminated.

The traction control system described hereinbefore is also adaptable for use with vehicles of the track-laying type, as illustrated in Fig. 5. In this embodiment the structure of FIG. 2 is modified only to the extent of replacing the driven wheel 34 with a sprocket 54 and mounting an endless track about the front and rear wheels. Mounting of the track is facilitated by releasing the locking bolts 42 and allowing the arms 16 and 18 to pivot downward temporarily to shorten the distance between the wheels. After the track is mounted on the wheels, the arms are pivoted upward until the upper stretch of track between the wheels are brought into firm engagement with the sprocket.

The endless track comprises a pair of laterally spaced belts 56 interconnected at longitudinally spaced intervals by transversely elongated ground engaging lugs 58 on the outer sides of the belts. On the underside of the belts and registering with each lug is a pair of laterally spaced guide members 60. The inner ends of these members are offset inwardly of the track, and each pair receives between them the pneumatic tires of the front and rear wheels. In this manner the track is maintained in proper alignment on the wheels.

In FIG. 6 the traction control system of the present invention is associated with a tandem type vehicle frame 62 in which each of the front and rear road-engaging wheels 64 and 66 is driven by connection to the driven shaft 68 of a differential contained in the differential housing 70. The gear mechanisms of the differentials are interconnected by a common main drive shaft 72 and associated universal joints 74, in conventional manner.

The end portions of the differential housings are journaled in brackets 76, intermediate the ends of the latter, by suitable mounting bearings (not shown). The lower ends of the brackets are interconnected pivotally by the walking beam 78 which, in turn, is mounted pivotally intermediate its ends by the pivot shaft 80 supported from the brackets 82 secured to the vehicle frame side members.

The upper ends of the brackets 76 are interconnected pivotally by the links 84 and 86. A pivot pin 88 connects the inner ends of these links to one arm 90 of a bellcrank lever which, in turn, is mounted pivotally intermediate its ends on the vehicle frame by means of the pivot pin 92. The other arm 94 of the bellcrank lever is connected pivotally through the link 96 to the walking beam 78 at the pivot pin 98 located forward of the pivot shaft 80.

Thus, a driving force moving the vehicle forwardly toward the right and tending to elevate the front wheels 64 off the road, produces a counterclockwise torque on the differential housings 70. The links 84, 86 thus are moved toward the left pivoting the bellcrank lever clockwise about its pivot pin 92 and moving the link 96 downward. The walking beam 78 thus is pivoted clockwise about its pivot shaft 80, moving the front wheels downward away from the vehicle frame and into firm pressure contact with the road.

The traction control system illustrated in FIG. 7 is adapted for use with powered or unpowered vehicles in which the front and rear tandem wheels 100 and 102 may be supported independently for vertical movement relative to the vehicle frame 104. It is to be understood, of course, that the system also is usable with powered or unpowered wheels supported on walking beams, as in FIG. 6. In the embodiment illustrated the arms 106 and 108 are secured one to each of the wheel axles 110, if unpowered as shown, or to the differential housings if powered, and the arms are interconnected pivotally by the links 112 and 114. The inner ends of the links are connected by means of the pivot pin 116 to the arm 118 of a double bell crank lever. This lever is mounted pivotally intermediate its ends on the vehicle frame by means of the pivot pin 120. The forward end portion 122 of the lever is connected through the link 124 to the axle 110 or differential housing. One end of the link is connected pivotally to the lever by means of the pivot pin 126 and the opposite end of the link is connected to a bearing 128 mounted rotatably on the axle 110 or differential housing of the front wheel 100.

In similar manner, the opposite end portion 130 of the lever is connected to one end of the link 132 by means of the pivot pin 134. The opposite end of the link 132 is connected to the bearing 136 mounted rotatably on the axle 110 or differential housing of the rear wheel 102.

Assuming that the wheels of the vehicle are unpowered, as in the case of a trailer, but are provided with brake mechanism of conventional type, the application of a braking force tending to raise the rear wheel 103 off the road, produces a clockwise torque of the axles 110. The arms 106 and 108 attached to the axles thus rotate clockwise and, through the links 112 and 114, produce counterclockwise rotation of the bell crank lever about the pivot pin 120. The link 124 connecting the front wheel 100 thus is moved upward and the link 132 connecting the rear wheel 102 is moved downward. Accordingly, the rear wheel is maintained in firm pressure contact with the road, substantially equal to the pressure contact of the front wheel.

The embodiment illustrated in FIG. 8 also is adaptable to unpowered tandem wheels which may be mounted on the vehicle for independent vertical movement, or may be mounted on a common walking beam. Arms 140 and 142 are secured to the axles 144 of the front and rear wheels 146 and 148, respectively, and these arms are interconnected pivotally by the extensible hydraulic cylinder unit 150. A second extensible hydraulic cylinder unit 152 is mounted on one end on the vehicle frame 154, by means of the pivot pin 156, and the opposite end is connected to the bearing 158 mounted rotatably on the axle 144 of the rear wheel 148. A hydraulic conduit 160 interconnects the cylinder units in such manner that extension of the first cylinder unit 150 effects extension of the second cylinder unit 152.

Accordingly, upon the application of a braking force tending to raise the rear wheel 148 off the road, the resulting clockwise torque of the axles 144 effects extension of the hydraulic cylinder unit 150 and simultaneous extension of the second cylinder unit 152. The rear wheel thus is moved downward away from the vehicle frame into firm pressure contact with the road.

The traction control system illustrated in FIG. 9 is adaptable for use with powered or unpowered tandem wheels which may be mounted on the vehicle for independent vertical movement, or may be mounted on a common walking beam as in FIG. 6. An arm 162 is secured to the differential housing 164 (or to the axle if unpowered) of the front wheel 166, and this arm is connected pivotally through the extensible hydraulic cylinder unit 168 to the bracket 170 on the vehicle frame 172. A second extensible hydraulic cylinder unit 174 is connected at one end to the vehicle frame, by means of the pivot pin 176, and the opposite end is connected to the bearing 178 mounted rotatably on the differential housing 164. The conduits 180 and 182 interconnect the cylinder units in such manner that shortening of the cylinder unit 168 effects extension of the cylinder unit 174.

In similar manner, the arm 184 secured to the differential housing 186 of the rear wheel 188 is connected pivotally through the extensible hydraulic cylinder unit 190 to the bracket 170. The second extensible hydraulic cylinder unit 192 is connected at one end to the vehicle frame, by the pivot pin 194, and at its opposite end to the bearing 196 mounted rotatably on the differential housing 186 of the rear wheel 188. The conduits 198 and 200 interconnect the cylinder units in such manner that shortening of the first cylinder unit 190 effects extension of the second cylinder unit 192.

Accordingly, assuming the wheels are powered through differentials, a forward driving force tending to raise the front wheels 166 off the road produces the counterclockwise torque of the differential housings 164 and 186. The resulting shortening of the cylinder unit 168 effects extension of the associated cylinder unit 174 to move the front wheel downward away from the frame into firm pressure contact with the road. Simultaneously, extension of the cylinder unit 190 effects shortening of the associated cylinder unit 192, drawing the rear wheel 188 upward toward the vehicle frame to substantially equalize the pressure contact of the front and rear wheels on the road.

When a braking force is applied the resulting clockwise torque of the differential housing 164 and 186, or of the axles if the vehicle is unpowered, reverses the foregoing actions of the cylinder units, raising the front wheels 166 toward the vehicle frame and moving the rear wheels 188 away from the vehicle frame, to maintain substantially equal road-engaging pressure of the front and rear wheels.

It will be apparent that if the front and rear wheels in FIG. 9 are mounted on a common walking beam, as in FIG. 6, the arm and cylinder units associated with one of the wheels may be eliminated.

From the foregoing it will be appreciated that the present invention provides for tandem wheel vehicles a traction control system which utilizes to advantage the torque of the axles or differential housings associated with the wheels, to maintain substantially equal road engaging pressure on the front and rear wheels, both during the applications of a heavy driving force and a heavy braking force. Moreover, the control system of the present invention is adaptable for use with conventional tandem wheel mounting systems with minimum modification and minimum cost.

It will be apparent to those skilled in the art that various changes in the size, shape, type and arrangement of parts described hereinbefore may be made without departing from the spirit of this invention.

Having now described my invention and the manner in which it may be used, I claim:

1. A traction control system for tandem type vehicle wheels, comprising
   a. a pair of support members mounted intermediate their ends adjacent opposite lateral sides of the vehicle for pivotal movement on an axis extending transversely of the vehicle, each support member supporting front and rear wheels at its corresponding opposite ends,
   b. a driven shaft extending transversely of the vehicle on an axis disposed between said front and rear wheels, the driven shaft being operatively coupled to said front and rear wheels,
   c. a differential housing mounted on the vehicle for pivotal movement on an axis extending transversely of the vehicle, the differential housing supporting the driven shaft and forming torque producing means, and
   d. a transverse resilient connector member secured intermediate its ends to the differential housing and at its opposite ends to the pair of support members at points on the latter spaced longitudinally from their pivot mounting on the vehicle,
   e. the connector member thereby functioning to move the front wheels downward away from the vehicle and the rear wheels upward toward the vehicle when a vehicle driving force is applied to the torque producing means, and to move the front wheels upward toward the vehicle and the rear wheels downward away from the vehicle when a vehicle braking force is applied to the torque-producing means.

2. The traction control system of claim 1, wherein the driven shaft mounts a pair of driven wheels, one positioned between each pair of front and rear wheels in operative driving engagement therewith.

3. The traction control system of claim 2 wherein the front and rear wheels and the driven wheels include pneumatic tires.

4. The traction control system of claim 2 wherein each pair of front and rear wheels supports an endless track, and each driven wheel comprises a sprocket in driving engagement with the associated endless track.